M. MERLISS.
PISTON RING REMOVER.
APPLICATION FILED SEPT. 18, 1913.
1,100,486.
Patented June 16, 1914.
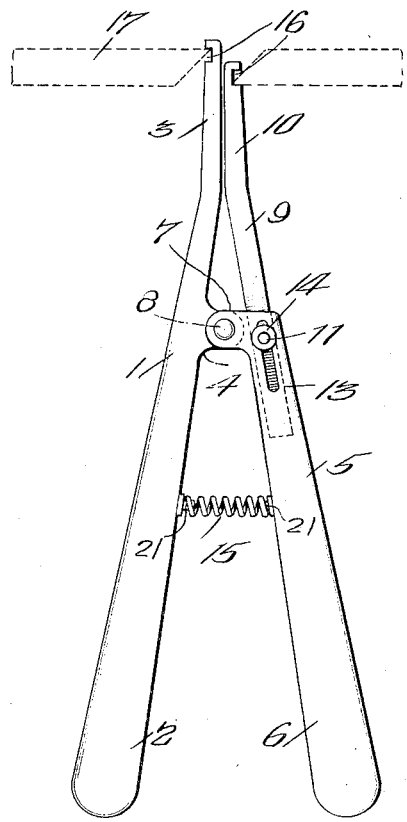
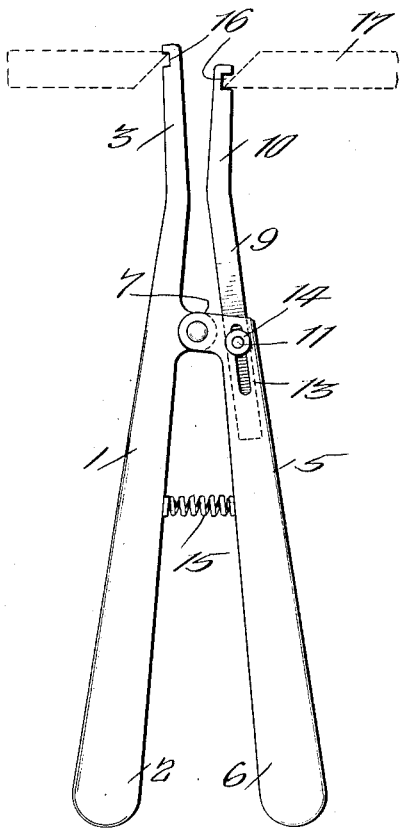
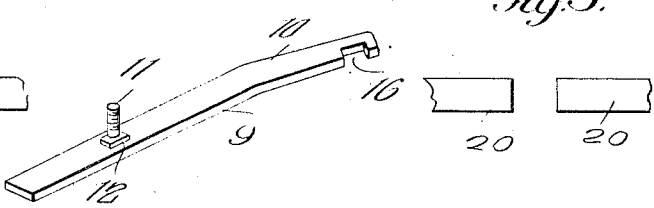
WITNESSES
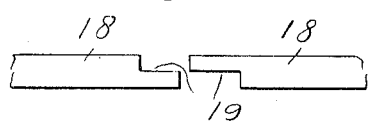
INVENTOR
MORDUCH MERLISS,
BY
ATTORNEYS

UNITED STATES PATENT OFFICE.

MORDUCK MERLISS, OF FLINT, MICHIGAN.

PISTON-RING REMOVER.

1,100,486.  Specification of Letters Patent.  Patented June 16, 1914.

Application filed September 18, 1913. Serial No. 790,424.

*To all whom it may concern:*

Be it known that I, MORDUCK MERLISS, a citizen of the United States, and a resident of Flint, in the county of Genesee and State of Michigan, have invented a new and useful Improvement in Piston-Ring Removers, of which the following is a specification.

My invention is an improvement in piston ring removers, and has for its object to provide a device of the character specified, having means for engaging between the split ends of the ring, and for spreading the ring to permit the ring to be slipped from off the piston and without distorting or twisting the ring, and wherein the engaging portions of the remover are capable of adjustment with respect to each other for permitting the remover to be used with any width of ring.

In the drawings:—Figure 1 is a front view of the improved remover with the parts in one position, Fig. 2 is a similar view with the parts in another position, Fig. 3 is a perspective view of one of the engaging jaws, and Figs. 4 and 5 are views showing modified forms of piston rings.

The present embodiment of the invention comprises a pair of opposed connected members, one of the said members comprising a shank 1, having one of its ends rounded to form a grip 2. In the present construction, the said member is composed of channel material, the channel being on the inner face, and the said shank gradually decreases in size from the grip toward the opposite end. The end of the shank remote from the grip is bent laterally as indicated at 3, for a purpose to be presently described, and the shank is provided near the said end with inwardly extending bearing lugs 4. The other member comprises a shank 5, having one end shaped to form a grip 6, and the said shank is of channel material as is the shank 1, and is arranged with the channel inward. At its inner end the said shank is provided with laterally extending bearing lugs 7, which lap upon the lugs of the shank 1, and a pivot pin 8 is passed through the lapping bearing lugs to pivotally connect the members together.

An extension bar is adjustably connected with the member 5, the said bar comprising a portion 9, extending parallel with the member 5, and a portion 10 lying at an angle with respect to the portion 9. The extension bar in the present instance, is of rectangular cross section, and is provided on one face with a threaded stem 11, and with a slide or guide block 12 at the base of the stem.

The shank or member 5 is provided with a longitudinally extending slot 13 at its inner end for engagement by the slide or guide block 12, and a nut 14 is threaded on to the stem. The portion 9 of the extension bar 9—10 is arranged on the inner side of one of the side walls of the shank or member 5, with the stem 11 extending through the slot 13, and with the slide or guide block 12 moving in the slot. The nut 14 is then threaded on to the shank 11, and the said nut engages the shank or member 5, to hold the extension bar in adjusted position. The angle of the portion 3 of the shank 1 with respect to the said shank, and the angle of the portion 10 of the extension bar 9—10 with respect to the portion 9, is such that the adjacent edges of the said portions 3 and 10 will be parallel, when the said portions are moved together, as shown in Fig. 1.

A coil spring 15 is arranged between the shanks or members 1 and 5, on the same side of the pivotal connection as the grips of the said members, and the said spring normally holds the tool with the portions 3 and 10 thereof in parallelism. Each of the said portions is provided with a notch or recess 16, in its outer edge, and near the free end thereof.

As is known, the piston rings indicated at 17 are split, the line of the split being inclined or beveled with respect to the side edges of the ring. The engaging portions of the tool are adapted to engage the points of the split ends of the ring, and since the said points are offset laterally with respect to each other, the notch 16 of the extension bar must be offset longitudinally of the tool with respect to the notch of member 1.

Since the distance between the points at the split end of the ring varies in accordance with the width of the ring, a tool to be fitted for all size rings, must be so arranged that the engaging portions of the tool may be adjusted with respect to each other in accordance with the width of the ring. For this reason the extension bar 9—10 is slidably connected with the member 5 of the tool, and it will be evident that by loosening the nut 11, the said extension bar may be adjusted in accordance with the width of the ring. It is obvious that the extension bar might be integral with the member 5, where the tool is intended for one size of ring only.

In operation, the tool is placed as shown in Fig. 1, with the points of the split end of the ring in engagement with the notches 16 of the tool. When so engaged, the grips of the tool are pressed toward each other, thus forcing the ends of the ring away from each other, and expanding the ring. When so expanded, the ring may be removed from the piston.

It is obvious that the tool may be used with equal facility for placing rings on the piston, the process being merely reversed when so used. The device consists in fact of a pair of shanks or members lying alongside each other, each of the said shanks or members having at one end an angular portion, the said portions being parallel and normally abutting at their inner edges, and the said shanks or members diverging from each other toward their opposite ends. The said members are pivotally connected, and have notches as specified, and one of the said members is sectional to permit the notches of the two shanks or members to be offset longitudinally of the tool.

It will be evident that the improved remover may be used with any form of piston ring, as for instance, in the form shown in Fig. 4, wherein the ends 18 of the ring are notched, recessed or rabbeted, as indicated at 19, or in the ring shown in Fig. 5, wherein the ends 20 of the ring are perpendicular to the plane of the ring. It will be noted that the device is equally efficient for spreading the rings. In the form of rings shown in Fig. 4, the notches 16 of the remover are offset longitudinally in order to engage the ends of the ring, but in the form of ring shown in Fig. 5, the notches need not be offset. The spring 15 is held in position by means of pins 21, the said pins being on the members and engaging the ends of the spring.

I claim:—

1. A piston ring remover comprising a pair of shanks, each of the said shanks having one end rounded to form a grip, one of the said shanks having a pair of inwardly extending bearing lugs intermediate its ends, and the other of the said shanks having a pair of bearing lugs at the end remote from the grip, a pivotal connection between the lugs of the shanks, a spring between the shanks and normally forcing the ends provided with the grips away from each other, an extension bar slidably connected with the last-named member and extending on the opposite side of the pivotal connection from the grip, the free end of the extension bar and the adjacent end of the other shank being bent to lie along side each other when in contact, each of the said bent portions having a notch in its outer edge and at the free end thereof, and means for securing the extension bar in adjusted position.

2. A piston ring remover comprising a pair of pivotally connected members, the said members being approximately parallel at one end, and the said members diverging from each other toward the opposite end, a spring engaging the members normally pressing the parallel portions toward each other, each of the said portions having a notch at its free end, one of the said members comprising longitudinally adjustable sections to permit the notches to be offset from each other, and means for fixing the sections in adjusted position.

3. A piston ring remover comprising a pair of pivotally connected members, the members extending approximately parallel at one end and diverging from each other toward the opposite end, a spring engaging the members and normally pressing the parallel portions toward each other, each of the said portions having a notch at its free end and in the edge remote from the other member, the notches of the members being offset longitudinally with respect to each other.

4. A piston ring remover comprising pivotally connected members, each of the said members having at one end a notch at the edge remote from the other member, and one of the members comprising longitudinally adjustable sections to permit the notches of the members to be offset longitudinally with respect to each other.

MORDUCK MERLISS.

Witnesses:
E. A. MURPHY,
JOHN H. TYLER.